(12) United States Patent
Lee et al.

(10) Patent No.: US 8,635,522 B2
(45) Date of Patent: Jan. 21, 2014

(54) HYBRID WEB CONTAINER FOR CROSS-PLATFORM MOBILE APPLICATIONS

(75) Inventors: Andrew Wai Lee, Markham (CA); David John Brandow, Guelph (CA); Johannes Alberti, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 77 days.

(21) Appl. No.: 13/106,672

(22) Filed: May 12, 2011

(65) Prior Publication Data

US 2012/0290914 A1 Nov. 15, 2012

(51) Int. Cl.
*G06F 17/24* (2006.01)
*G06F 17/25* (2006.01)

(52) U.S. Cl.
USPC .......................................... 715/234; 715/238

(58) Field of Classification Search
USPC ................................................. 715/234, 238
See application file for complete search history.

(56) References Cited

U.S. PATENT DOCUMENTS

| | | | |
|---|---|---|---|
| 6,389,437 B2* | 5/2002 | Stoub ............................. | 715/201 |
| 6,594,484 B1* | 7/2003 | Hitchings, Jr. .............. | 455/414.1 |
| 7,055,097 B1* | 5/2006 | Netsch ........................... | 715/207 |
| 7,313,757 B2 | 12/2007 | Bradley et al. | |
| 7,552,868 B1* | 6/2009 | Block et al. .................... | 235/379 |
| 7,637,421 B1* | 12/2009 | Trocme .......................... | 235/379 |
| 8,393,534 B1* | 3/2013 | Bowen et al. .................. | 235/379 |
| 2001/0011364 A1* | 8/2001 | Stoub .............................. | 717/1 |
| 2004/0103371 A1* | 5/2004 | Chen et al. .................... | 715/513 |
| 2005/0188203 A1* | 8/2005 | Bhaskaran et al. ........... | 713/176 |
| 2008/0127179 A1 | 5/2008 | Moss et al. | |
| 2009/0241135 A1* | 9/2009 | Wong et al. .................... | 719/328 |
| 2009/0276455 A1* | 11/2009 | Yu et al. ......................... | 707/102 |
| 2010/0153544 A1* | 6/2010 | Krassner et al. .............. | 709/224 |
| 2011/0125731 A1* | 5/2011 | Isozu ............................. | 707/722 |
| 2011/0258595 A1 | 10/2011 | Clevenger | |

OTHER PUBLICATIONS

"HTML Commands." http://www.gnu.org/software/screen/manual/screen.html. <no date available>.*
"HTML Tags (HTML5 Compliant)". http://www.w3schools.com/tags/default.asp. <no date available>.*
Notification of Transmittal of the International Search Report and the Written Opinion of the International Searching Authority, or the Declaration, of International Application No. PCT/US2012/036336, mailed Nov. 29, 2012, 11 pages.

* cited by examiner

*Primary Examiner* — Doug Hutton, Jr.
*Assistant Examiner* — Soumya Dasgupta
(74) *Attorney, Agent, or Firm* — Sterne, Kessler, Goldstein & Fox PLLC

(57) ABSTRACT

The systems, methods and computer program products for designing cross-platform mobile applications that execute on multiple operating platforms. The mobile application is activated with a workflow that includes data from a data source. The mobile application includes a plurality of web files configured to cause the mobile application to manipulate data from the data source. At least one web file in the plurality of web files is configured to display one or more screens of the mobile application. At least one file in the plurality of web files is configured to implement business logic of the mobile application. The mobile application also includes a container service configured to communicate data between the mobile device and a data source.

13 Claims, 8 Drawing Sheets

HYBRID WEB CONTAINER FOR CROSS-PLATFORM MOBILE APPLICATIONS

BACKGROUND OF THE INVENTION

1. Field of the Invention

The present invention is generally related to mobile applications, and more particularly related to cross-platform mobile applications that execute on mobile devices having different operating platforms.

2. Background Art

As the popularity of mobile devices grows, so does the need for mobile applications that allow users to receive, review, and update data. Mobile applications grew from simple applications targeting an individual device, to complex applications that retrieve and transmit data from complex back-end systems to a variety of mobile devices. This constant access to data allows users to use the mobile devices as functional and essential business tools.

As the popularity of the mobile devices grew, many different types of computing devices became available to the users. Those mobile devices may operate on different operating platforms, each platform having its own specifications, libraries, etc. As a result, a mobile application that executes on one operating platform is often not compatible with other operating platforms.

When an application developer designs a mobile application, the mobile application must be compatible with an operating platform executing on a mobile device. To ensure compatibility of a mobile application with multiple mobile devices, application developers are forced to design multiple versions of a mobile application, where each version is compatible with a particular operating platform. Often, each version is designed in a different programming language that acts as an interface between the mobile application and the operating platform of a mobile device. This causes a waste in time and resources as the same mobile application is written in multiple versions. Additionally, developing multiple versions of the same mobile application may require multiple developers, as one developer may not have technical know-how to develop the same mobile application in multiple programming languages or understand the intricacies associated with each operating platform.

To avoid designing and maintaining multiple versions of the same mobile application, application developers attempted to use Extensive Markup Language ("XML") and metadata to design one instance of a mobile application that is compatible with multiple operating platforms. However, designing mobile applications using XML and metadata is limiting because those mobile applications often lack flexibility and customization necessary to design competitive display screens, forms and controls.

Therefore, what is needed is an improved approach for designing a cross-platform mobile application that executes on multiple operating platforms.

BRIEF SUMMARY OF THE INVENTION

The present invention is directed to systems, methods and computer program products for generating a cross-platform mobile application that executes on multiple operating platforms. The cross-platform mobile application for receiving data from a data source and manipulating data on a plurality of mobile devices is generated using a plurality of web files. The web files are packaged and distributed to the plurality of mobile devices.

The present invention is also directed to systems, methods and computer program products for using a cross-platform mobile application to manipulate data. The cross-platform mobile application is activated with a workflow that includes data from a data source. The cross-platform mobile application includes a plurality of web files configured to cause the cross-platform mobile application to manipulate the data. At least one web file in the plurality of web files is configured to display one or more screens of the cross-platform mobile application. At least one file in the plurality of web files is configured to implement business logic of the cross-platform mobile application. The cross-platform mobile application also includes a container service configured to communicate data between the mobile device and a data source.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art(s) to make and use the invention.

Figure 1:
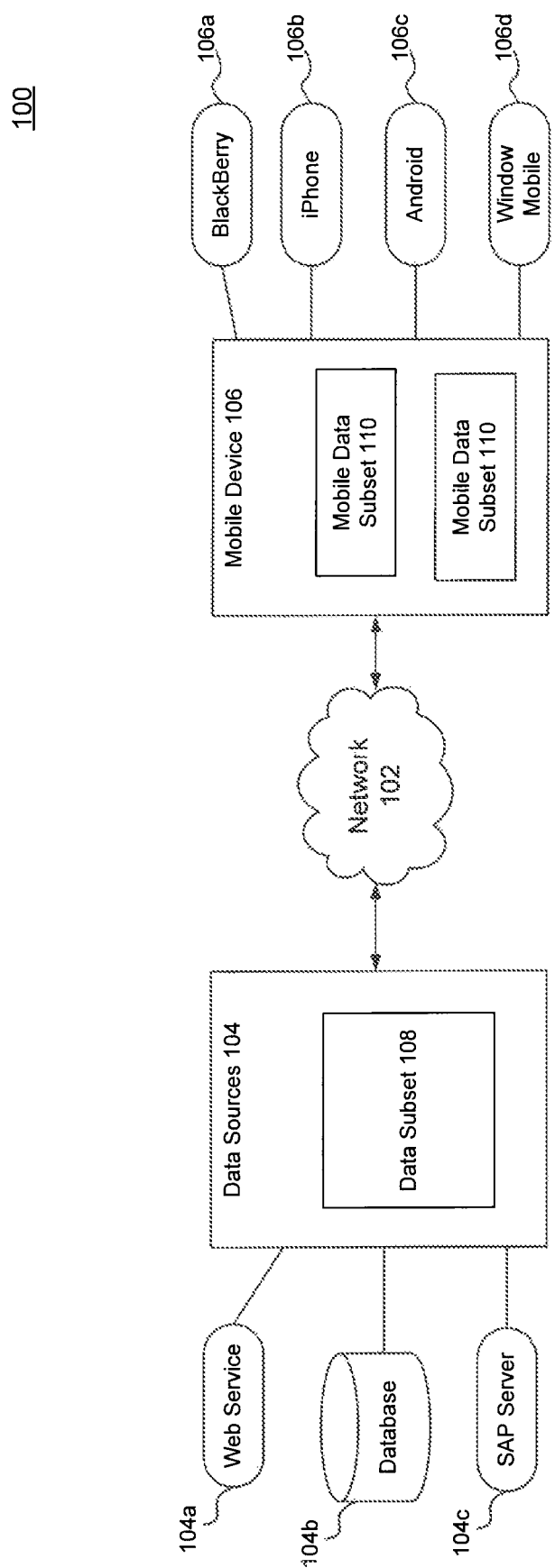
FIG. 1 is a block diagram of a distributed system environment, according to an embodiment.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1 is a block diagram of a distributed system 100. Distributed system 100 allows for sending, receiving, storing and updating data between multiple client devices and data sources. Distributed system 100 includes a network 102, multiple data sources 104 and multiple client devices, such as mobile devices 106.

Network 102 may be any network or combination of networks that can carry data communication. Such a network 102 may include, but is not limited to, a local area network, metropolitan area network, and/or wide area network such as the Internet. Network 102 can support protocols and technologies including, but not limited to, World Wide Web protocols and/or services. Intermediate web servers, gateways, or other servers may be provided between components of the system shown in FIG. 1 depending upon a particular application or environment.

Data source 104 is a computing device, such as a server or another device capable of storing and disseminating data in a data set 108. Example data sources 104 are a web service 104a, a database 104b, or a Systems, Applications and Products (SAP) Server 104c, available from SAP AG of Weinheim, Germany, to name only a few. Typically, data sources 104 use network 102 to disseminate data to the computing devices, such as mobile devices 106. Data sources 104 also use network 102 to receive and store data from the client devices, such as mobile devices 106.

Data set 108 includes content or data that is stored in data source 104. Data in data set 108 may be digitized content that is collected, organized, stored, updated and retrieved from data source 104. Example data in data set 108 may be variables, numbers, characters, documents, images, etc.

Mobile device 106 is a computing device under control of a user and is capable of requesting and receiving data from data sources 104. Example mobile devices 106 are smart phones, such as BlackBerry 106a, iPhone 106b, Android 106c, Windows Mobile 106d, etc. Because memory (as described in detail in FIG. 8) on mobile devices 106 is usually smaller than memory on data sources 104, mobile devices 106 typically are able to store and process a subset of data set 108. Data that is processed on mobile device 106 is stored in mobile data subset 110. After data in mobile data subset 110 is processed, mobile device 106 and data source 108 synchronize the changes to the data.

Mobile devices 106 operate on a variety of operating platforms. For example, and without limiting, BlackBerries 106a operate on BlackBerry OS by RIM Inc., iPhones 106b operate on iOS by Apple Inc., Androids 106c operate on a Linux-based kernel, and Windows Mobiles 106d operate on Windows Mobile by Microsoft Inc. As a result, conventional application developers are either forced to develop mobile applications for manipulating data on mobile devices 106 in multiple development languages, such as Java for BlackBerries 106a, Objective-C for iPhones 106b, a version of Java developed by Google Inc., for Androids 106c, and C# (C-Sharp) developed by Microsoft Inc., for Windows Mobile 106d, or limit the customization included in the mobile application and develop the mobile application with XML and metadata.

2. System Architecture

Figure 2:
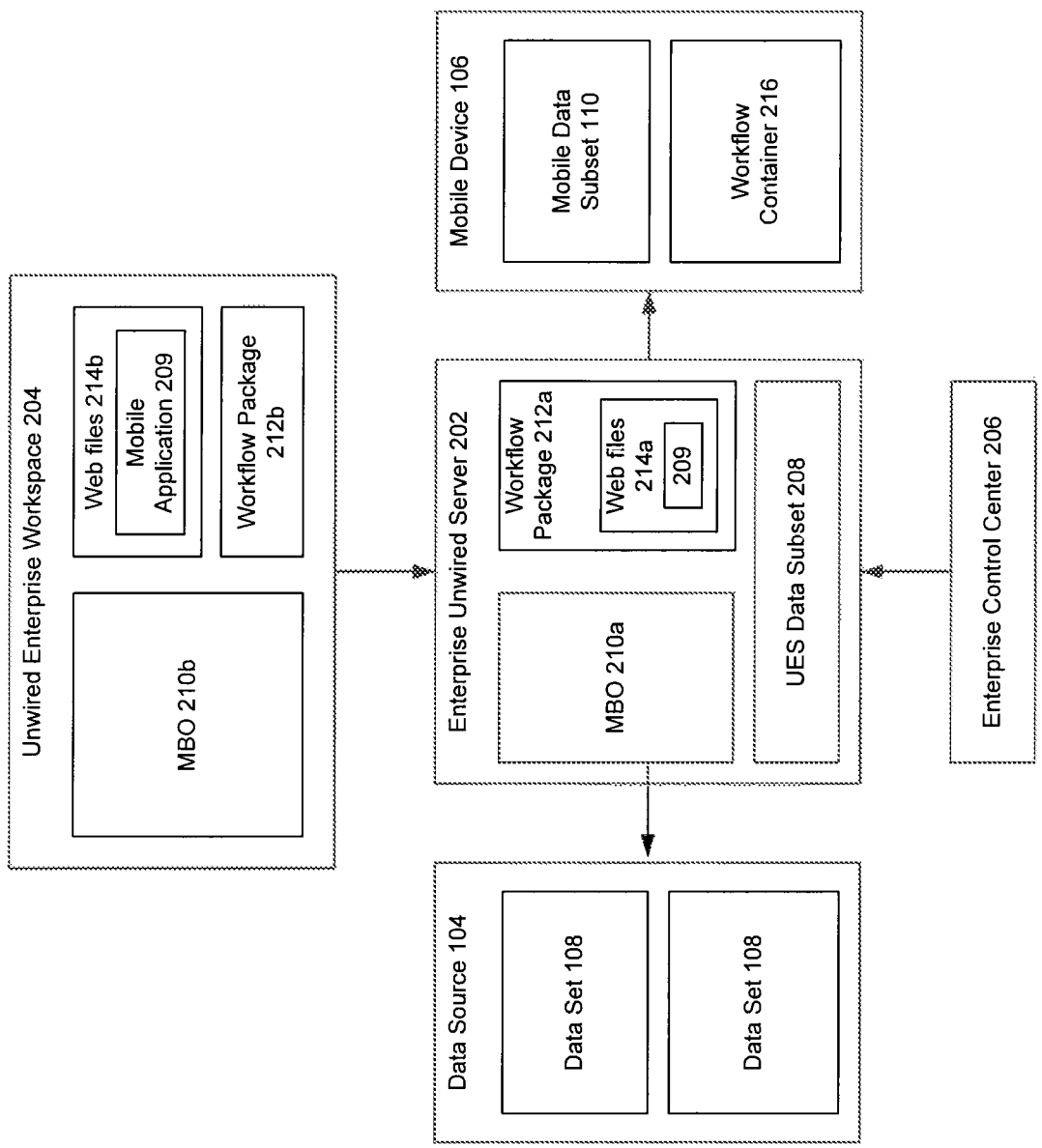
FIG. 2 is a block diagram of an unwired enterprise platform, according to an embodiment.

FIG. 2 is a block diagram of an Unwired Enterprise Platform (UEP) 200. UEP is a mobile application platform that simplifies development, deployment and management of cross-platform mobile applications. UEP 200 allows an application developer to design and implement a custom, cross-platform mobile application that executes on multiple operating platforms. UEP 200 includes an Unwired Enterprise Server ("UES") 202, an Unwired Enterprise Workspace ("UEW") 204 and an Enterprise Control Center ("ECC") 206. Example UEP 200 is a Sybase Unwired Platform ("SUP") available from Sybase, Inc. of Dublin, Calif.

UES 202 includes mobile business objects ("MBOs") 210 and workflow packages 212. MBO 210 is a software object, similar to, for example, a class in C++ or Java programming languages. It encapsulates business logic of mobile application 209. MBO 210 also includes attributes that map to data in data set 108. Wkien mobile application 209 requires data, mobile applications use MBOs 210 to retrieve the required data from data set 108.

MBO 210 is developed and compiled on UEW 204, such as, for example, MBO 210b. After compilation, MBO 210b is deployed to UES 202, where UES 202 binds MBO 210, such as MBO 210a, to data source 104.

Workflow package 212 is a package that enables an application developer to deploy a mobile application to the UES 202. Workflow package 212 that is stored on UES 202 is workflow package 212a. Workflow package 212 that is compiled on UEW 204 is workflow package 212b.

Workflow package 212 include web files 214 that include mobile application 209, connectivity files that enable connectivity between UES 202, data source 104 and mobile device 106, and installation files that deploy mobile application 209 to mobile devices 106. In an embodiment, UES 202 may receive workflow package 212 from UEW 204 as a compressed package or in a ZIP file format. A person skilled in the art will appreciate that a zip file may include multiple files that were compressed using a data compression algorithm that reduces file size.

Each workflow package 212 includes web files 214 that include a mobile application 209. Unlike conventional mobile applications that execute only on computing devices having a compatible operating platform, web files 214 enable mobile application 209 to execute on mobile devices 106 having differing operating platforms. Moreover, unlike conventional mobile applications that use metadata to display screens on the computing devices and do not allow for extensive customization of the screen layout, web files 214 generate mobile applications 209 that include extensive customization and data interaction.

When UES 202 receives workflow package 212, UES 202 deploys mobile application 209 as web files 214 to mobile devices 106. On mobile device 106, web files 214 are installed in a workflow container 216, as described below.

When mobile device 106 receives data from UES 202, a user may manipulate data. After a user manipulates data, mobile device 106 synchronizes with UES 202 by returning the manipulated data to UES 202. On UES 202, the manipulated data is stored in UES data subset 208.

UES 202 uses MBO 210 to store and retrieve data from data source 104. For example, UES 202 uses MBOs 210 associated with mobile application 209 to access and retrieve data from data set 108. When UES 202 retrieves data from data set 108, it stores data on UES 202 as UES data subset 208. Periodically, UES 202 synchronizes with data source 104 by updating data set 108 with the manipulated data stored in UES data subset 208. Example UES 202 is a Sybase Unwired Server, from Sybase, Inc. of Dublin, Calif.

Figure 3:
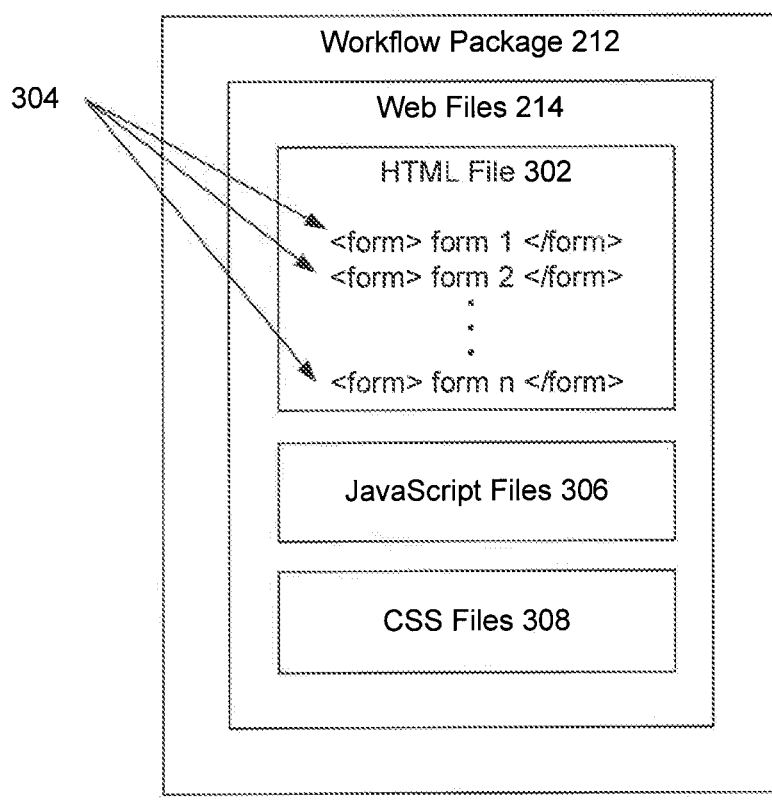
FIG. 3 is a block diagram of an exemplary embodiment of web files that generate a cross-platform mobile application, according to an embodiment.

FIG. 3 is a block diagram of an exemplary embodiment 300 of web files that generate a cross-platform mobile application, according to an embodiment. Web files 214 include, but are not limited to, HTML (Hyper Text Markup Language) file 302, JavaScript file 306 and CSS file 308.

HTML file 302 displays screens of mobile application 209 using HTML. A person skilled in the art will appreciate that HTML is used for designing a web page. As a result, a screen in mobile application 209 resembles a web page and can be displayed by a web browser. HTML file includes forms 304 that are HTML tags. Each form 304 is a screen in mobile application 209. When a user navigates between different screens, using for example, a web browser on mobile device 106, user actually navigates between different forms in HTML file 302.

JavaScript file 306 includes methods that execute business logic of mobile application 209. The methods included in JavaScript file 306 may be triggered when a user selects a link or a button included in form 304, opens a particular form 304, etc. Additionally, JavaScript file 306 allows an application developer to include functionality that activates other features or applications native to mobile device 106. A person skilled in the art will appreciate that a native application is an application that is designed to run on an operating platform of mobile device 106. For example, a developer may add methods to JavaScript file 306 to activate the camera or a calculator on mobile device 106.

CSS file 308 includes a style sheet language. The style sheet language is used to describe the presentation of a document, such as a webpage written in HTML, to a user. For example, CSS file 308 includes elements that control layout of a webpage, text size, color, and font.

Going back to FIG. 2, UEW 204 is a development environment provided to an application developer. An application developer uses UEW 204 to develop, design, test and deploy mobile applications 209, web files 214b, MBOs 210b, etc. UEW 204 may be a plug-in into a development environment, such as, for example, Eclipse from EclipseSource Inc., or Visual Studio from Microsoft, Inc.

When a developer designs web files 214b for mobile application 209, UEW 204 provides the developer with a shell of HTML file 302 and JavaScript file 306. As described herein, a developer designs screens for mobile application 209 by including multiple forms 304 in HTML file 302. A developer is also provided with a shell for JavaScript files 306 to design business logic particular to mobile application 209. A developer may also use JavaScript files 306 to activate applications or features embedded on mobile device 106.

In an embodiment, UEW 204 may generate connectivity methods for connecting mobile application 209 executing on mobile device 106 to UES 202 and data source 104. For example, a developer may provide credentials such as the name of data source 104 and MBO(s) 210 for retrieving data in data set 108. UEW 204 may then use credentials provided by an application developer to generated connectivity logic.

When a developer completes designing mobile application 209, such as mobile application 209b, the developer compiles workflow package 212b. After UEW 204 generates workflow package 212b, UEW 204 deploys workflow package 212b to UES 202, as described herein. Example UEW 204 is a Sybase Unwired Workspace from Sybase, Inc. of Dublin, Calif.

ECC 206 is a web-based console for configuring and managing UES 202. An administrator may use ECC 206 to configure and deploy web files 214 included in workflow package 212 to mobile devices 106. An administrator may use ECC 206 to set up connectivity and data synchronization between UES 202 and data source 104. An administrator may also use ECC 206 to set up connectivity between UES 202 and mobile device(s) 106 for each mobile application 209. Example, ECC 206 is a Sybase Control Center, also available from Sybase, Inc. of Dublin, Calif.

Figure 4:
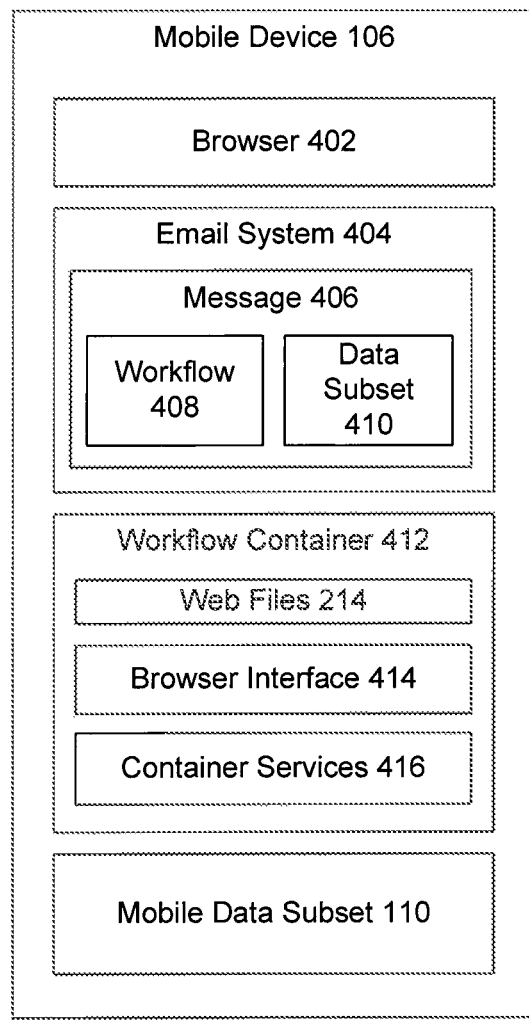
FIG. 4 is a block diagram of a mobile device capable of executing a cross-platform mobile application, according to an embodiment.

FIG. 4 is a block diagram 400 of a mobile device that executes a cross-platform mobile application. In addition to mobile data subset 110 described above, mobile device 106 includes a browser 402, an e-mail system 404, and a workflow container 412.

Browser 402 is an application executing on mobile device that receives, presents and traverses information and data over network 102. Browser may read an HTML file and display the contents of the file as a webpage on a display screen, of, for example, mobile device 106. In addition to accessing and displaying data, browser 402 also displays screens for mobile application 209 by accessing and reading web files 214. For example, browser 402 reads HTML file 302 and displays forms 304 included in HTML file 302 as mobile application screens.

E-mail system 404 receives electronic mail ("e-mail") over network 102. When e-mail system 404 receives a message 406 from UES 202 for mobile application 209, e-mail system 404 displays message 406 as a workflow 408. Workflow 408 includes data in data subset 410 from data source 104. Workflow 408 allows a user to use mobile application 209 to review, approve and manipulate data in data subset 410.

Workflow 408 is included with other e-mail messages in email system 404. When a user accesses workflow 408, mobile application 209 is activated, as described below.

Workflow container 412 includes web files 214, a browser interface 414, and container services 416. When UES 202 deploys web files 214 to mobile device 106, web files 214 are stored in workflow container 412. In an embodiment, web files 214 are stored in an encrypted storage area on mobile device 106. A person skilled in the art will appreciate that web files may be stored in a secure area and/or encrypted storage so that the contents of web files 214 are not easily read by unauthorized parties.

Browser interface 414 enables browser 402 to access web files 214 and present the included HTML file 302 to a user. For example, when a user uses e-mail system 402 to accesses workflow 408, browser interface 414 activates browser 402 and causes browser 402 to access web files 214. When browser 402 accesses web files 214, browser 402 displays screens to the user, using forms 304 in HTML file 302. As the user uses workflow 408 to access different screens, browser 402 displays different forms 304 in HTML file 302.

As the user accesses different screens and performs functions required by workflow 408, user executes methods included in JavaScript file 306. For example, by pressing a link that is displayed using HTML file 302, a user may execute a method in JavaScript file 306 that updates data in data subset 410. A user may approve or decline data in data subset 410. A user may also activate an application native to mobile device 106, such as an application that activates a camera or a calculator.

Container services 416 provide connectivity between mobile device 106 and UES 202. Container services 416 allow mobile device 106 to exchange data with UES 202. When mobile device 106 has access to network 102, mobile application 209 may use container services 416 to send data to UES 202 when a user completes processing workflow 406. However, when mobile device 106 lacks access to network 102, mobile application 209 may save the data that was manipulated using workflow 406 in mobile data subset 110. Once mobile device 106 is able to access network 102, mobile device 106 synchronizes with UES 202 and updates UES 202 with data stored in mobile data subset 110.

3. Deploying Cross-Platform Mobile Applications to the Server

Figure 5:
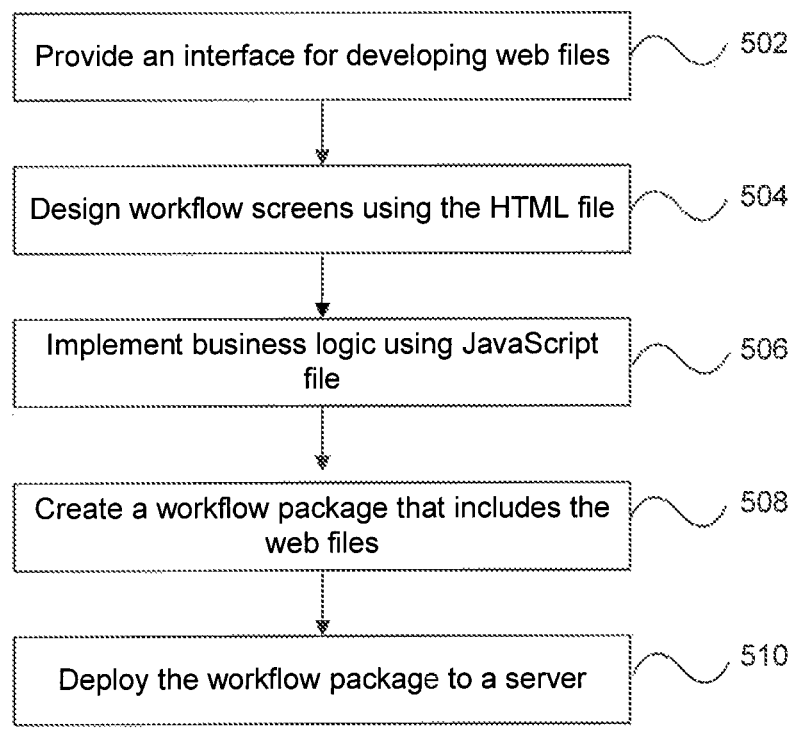
FIG. 5 is a flowchart of a method for designing a cross-platform mobile application, according to an embodiment.

FIG. 5 is a flowchart 500 of a method for developing a cross-platform mobile application, according to an embodiment.

At step 502, an application developer is provided with an interface for developing web files. For example, UEW 204 provides an application developer within an interface for developing web files 214b. As described herein, web files 214b may include HTML file 302, JavaScript file 306 and CSS file 308.

At step 504, a developer designs one or more screens. For example, a developer uses HTML file 302 to develop forms 304 that are displayed as screens on mobile device 106. Additionally, UEW 204 provides the application developer with CSS file 308 that the developer may use to customize the screen layout, color, text font, etc. of screens included in mobile application 209.

At step 506, a developer customizes mobile application. For example, UEW 204 provides a developer with shell JavaScript files 306. The shell includes functionality that is common to mobile applications 209. In the shell, the developer may customize mobile application 209 by including methods that execute business logic for mobile application 209. In JavaScript file 306, a developer may also include methods that activate and/or control features and applications native to mobile device 106.

At step 508, the workflow package is created. For example, UEW 204 creates workflow package 212 from web files 214, installation files, connectivity files, etc. In an embodiment, UEW 204 may compress workflow package 212 such that it takes up less memory space, as described herein.

At step 510, a workflow package is deployed to a server. For example, UEW 204 installs workflow package 212 on UES 202, using, for example, network 102.

Figure 6:
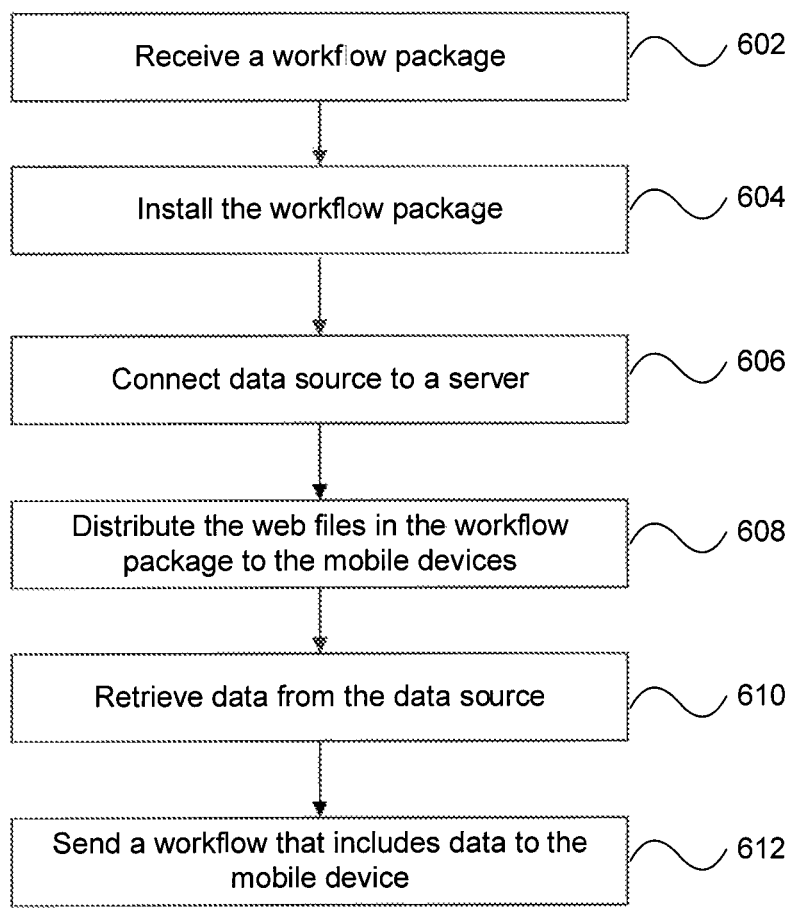
FIG. 6 is a flowchart of a method for distributing a cross-platform mobile application, according to an embodiment.

4. Using an Unwired Enterprise Server for Send and Receive Data Between Data Sources and Mobile Devices FIG. 6 is a flowchart 600 of a method for using a mobile application to send and receive data, according to an embodiment.

At step 602, a server receives a workflow package. For example, UES 202 receives workflow package 212 from UEW 204.

At step 604, a server installs a workflow package. For example, UES 202 installs workflow package 212 by executing the included installation files. If workflow package 212 is compressed, UES 202 executes a decompression algorithm to, for example, restore web files 214 included in workflow package 212 to an executable form.

At step 606, a data source is connected to a server. For example, UES 202 connects to data source 104 that stores data set 108 that is used by mobile application 209 included in workflow package 212.

At step 608, web files are distributed to mobile devices executing on different mobile platforms. For example, an administrator may use ECC 206 to connect to UES 202 and distribute mobile application 209 included in web files 214 to mobile devices 106. When mobile devices 106 receive and install web files 214 (which is described in detail in FIG. 7), a flowchart proceeds to step 610.

At step 610, data is retrieved from a data source. For example, UES 202 uses MBOs 210 associated with mobile application 209 to retrieve data from data set 108 on data source 104. When UES 202 retrieves data from data set 108, UES 202 may store the data in UES data subset 208 or send the data to mobile device 106.

At step 612, data is sent to a mobile device. For example, UES 202 sends message 206 that includes workflow 408 to mobile device 106. As described herein, workflow 408 may include data subset 410 from UES data subset 208 that a user may manipulate using mobile application 209 on mobile device 106.

5. Manipulating Data with a Cross-Platform Mobile Application

Figure 7:
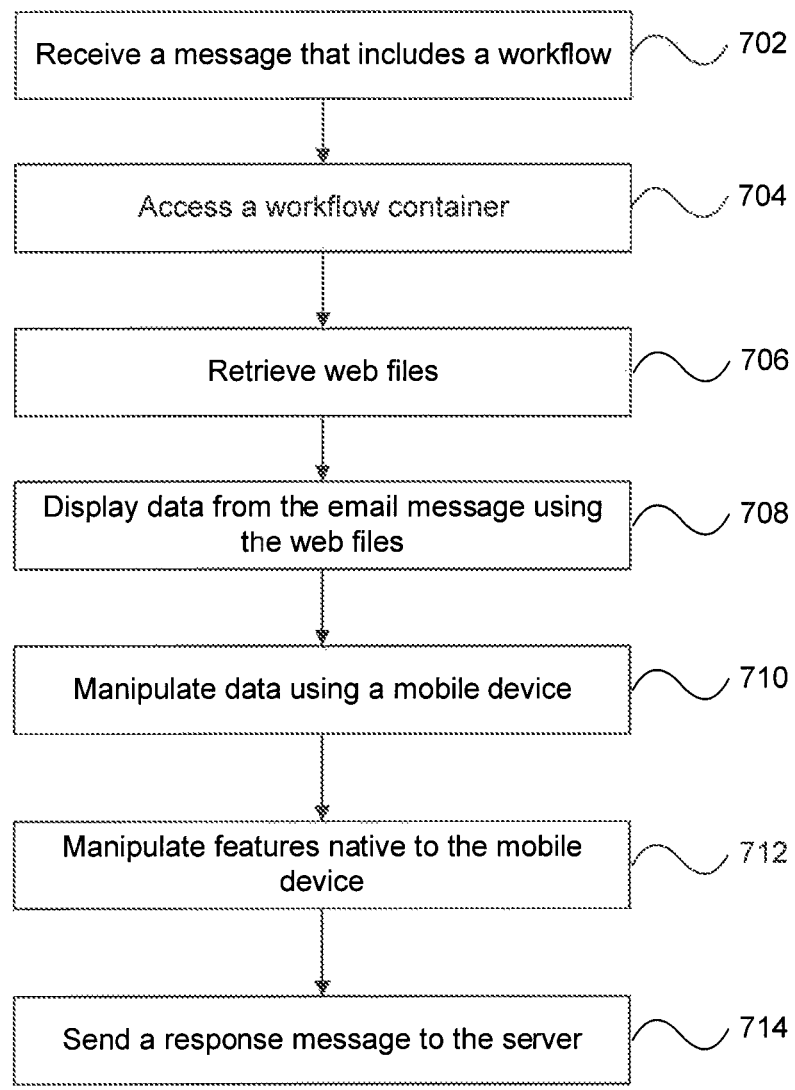
FIG. 7 is a flowchart for manipulating data with a cross-platform mobile application, according to an embodiment.

FIG. 7 is a flowchart of a method 700 for processing data on a cross-platform mobile application, according to an embodiment.

At step 702, a workflow message is received. For example, mobile device 106 receives message 406 that includes workflow 408 using an e-mail system 404. As described herein, workflow 408 may ask a user to modify, update and/or delete data by executing instructions in workflow 408.

At step 704, a workflow container is accessed. For example, a user opens workflow 408 in the same manner as a user opens an e-mail. When a user opens workflow 408, mobile device 106 accesses workflow container 412 that includes web files 214 for an associated mobile application 209.

At step 706, the web files are retrieved. For example, mobile device 106 retrieves we files 214 included in workflow container 41.

At step 708, the data is displayed using the web files. For example, browser interface 414 activates browser 402. When activated, browser 401 displays screens included as forms 304 in HTML file 302, as described herein. Additionally, CSS files 308 may be used to display, layout and color of forms 304 included in HTML file 302.

At step 710, a user manipulates data using a cross-platform mobile application on a mobile device. For example, as a user traverses forms 304, methods included in JavaScript file 306 that manipulate and store data may be executed, as described herein. Because mobile application 209 uses web files 214 to generate screens and process business logic included methods, mobile applications 209 may execute on multiple operating platforms.

At step 712, a user may activate applications on mobile device using a workflow. For example, a user may traverse to a screen that links to a method in JavaScript file 306 that launches native application stored on mobile device 106.

At step 714, a mobile device sends updated data to a server. For example, mobile device 106 synchronizes data in mobile data subset 110 with data stored on UES 202, as described herein.

6. Example Computer Implementation

Figure 8:
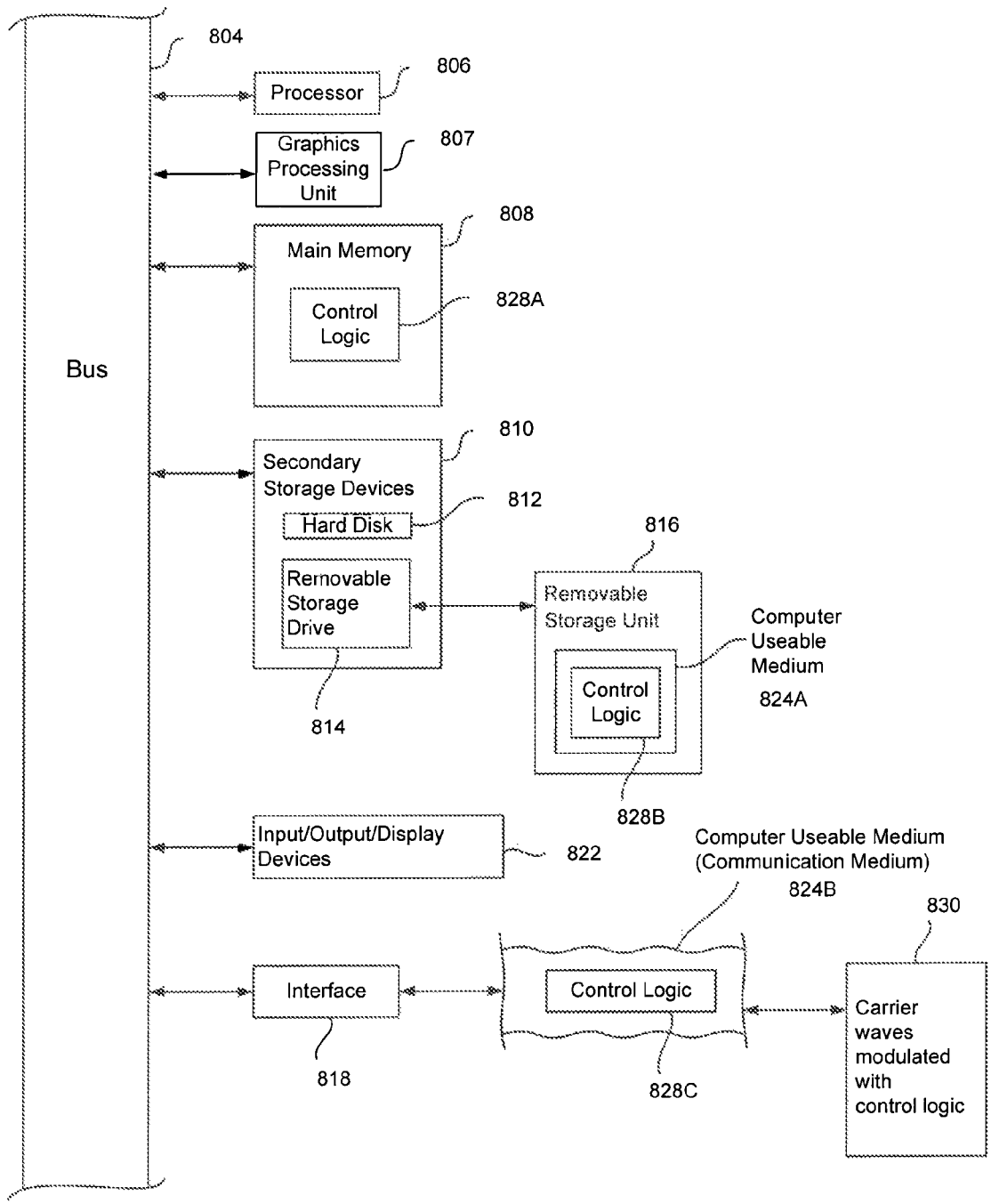
FIG. 8 illustrates an example computer system useful for implementing components of the invention.

In an embodiment of the present invention, the system and components of the present invention described herein are implemented using well known computers, such as computer 800 shown in FIG. 8.

Computer 800 can be any commercially available and well known computer capable of performing the functions described herein, such as computers available from International Business Machines, Apple, Sun, HP, Dell, Compaq, Digital, Cray, etc.

Computer 800 includes one or more processors (also called central processing units, or CPUs), such as a processor 806. The processor 806 is connected to a communication bus 804.

Processors 806 may include any conventional or special purpose processor, including, but not limited to, digital signal processor (DSP), field programmable gate array (FPGA), and application specific integrated circuit (ASIC).

Computer 800 includes one or more graphics processing units (also called GPUs), such as GPU 807. GPU 807 is a specialized processor that executes instructions and programs selected for complex graphics and mathematical operations in parallel.

Computer 800 also includes a main or primary memory 808, such as random access memory (RAM). The primary memory 808 has stored therein control logic 828A (computer software), and data.

Computer 800 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 1314 reads from and/or writes to the removable storage unit 816 in a well known manner.

Computer 800 also includes input/output/display devices 822, such as monitors, keyboards, pointing devices, touchscreen displays, etc.

Computer 800 further includes a communication or network interface 818. The network interface 818 enables the computer 800 to communicate with remote devices. For example, the network interface 818 allows computer 800 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from computer 800 via the communication medium 824B. More particularly, the computer 800 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 800, the main memory 808, the secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

7. Conclusion

It is to be appreciated that the Detailed Description section, and not the Summary and Abstract sections, is intended to be used to interpret the claims. The Summary and Abstract sections may set forth one or more, but not all, exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents

What is claimed is:

1. A method for generating a cross-platform mobile application, comprising:
    providing web files, including a forms file having multiple forms that create display screens for the cross-platform mobile application and a script file that customizes the cross-platform mobile application with business logic, wherein the multiple forms designate one display screen per form;
    generating the cross-platform mobile application using the web files, wherein the cross-platform mobile application receives data from a data source and manipulates data on a plurality of mobile devices; and
    distributing the web files to workflow containers on the plurality of mobile devices, whereby the workflow container includes a browser interface for browser access of the forms and script files upon request, and container services for the data access from the data source as the cross-platform application executes.

2. The method of claim 1, wherein at least one web file in the web files is an HTML file as the forms file, a JavaScript file as the script file, and a CSS file.

3. The method of claim 1, wherein at least one web file in the workflow container is encrypted.

4. The method of claim 1, further comprising:
    using one or more web files to access a feature native to a mobile device.

5. The method of claim 1, wherein the cross-platform mobile application activates with a workflow that allows the cross-platform mobile application to receive instructions from a user that manipulate data from a data source using the mobile device.

6. A system for generating a cross-platform mobile application that can execute on mobile devices operating on heterogeneous operating platforms, comprising:
    a processor;
    a memory coupled to the processor; and an unwired enterprise workspace (UEW) stored in the memory and executing on the processor and configured to:
  access web files including a forms file having multiple forms that create display screens for the cross-platform mobile application and a script file that customizes the cross-platform mobile application with business logic, wherein the multiple forms designate one display screen per form;
  generate the cross-platform mobile application using the web files wherein the cross-platform mobile application receives data from a data source and manipulates data on a plurality of mobile devices; and
  distribute the web files to a central server, wherein the central server distributes the web files to workflow containers on the mobile devices, whereby the workflow container includes a browser interface for browser access of the forms and script files upon request, and container services for the data access from the data source as the cross-platform application executes.

7. The system of claim 6, wherein at least one web file in the web files is an HTML file as the forms file, a JavaScript file as the script file and a CSS file.

8. The system of claim 6, wherein at least one web file in the workflow container is encrypted.

9. A non-transitory computer-readable medium, having instructions stored thereon, wherein the instructions cause a computing device to perform operations for generating a cross-platform mobile application, the instructions comprising:
  providing web files, including a forms file having multiple forms that creates display screens for the cross-platform mobile application and a script file that customizes the cross-platform mobile application with business logic, wherein the multiple forms designate one display screen per form;
  generating the cross-platform mobile application using the web files, wherein the cross-platform mobile application receives data from a data source and manipulates data on a plurality of mobile devices; and
  distributing the web files to workflow containers on the plurality of mobile devices, whereby the workflow container includes a browser interface for browser access of the forms and script files upon request, and container services for the data access from the data source as the cross-platform application executes.

10. The computer-readable medium of claim 9, wherein at least one web file in the web files is an HTML file as the forms file, a JavaScript file as the script file and a CSS file.

11. The computer-readable medium of claim 9, wherein at least one web file in the workflow container is encrypted.

12. The computer-readable medium of claim 9, the instructions further comprising:
  using one or more web files to access a feature native to a mobile device.

13. The computer-readable medium of claim 9, wherein the cross-platform mobile application activates with a workflow that allows the cross-platform mobile application to receive instructions from a user that manipulate data on a data source using the mobile device.

* * * * *